US007194587B2

(12) United States Patent
McCalpin et al.

(10) Patent No.: US 7,194,587 B2
(45) Date of Patent: Mar. 20, 2007

(54) LOCALIZED CACHE BLOCK FLUSH INSTRUCTION

(75) Inventors: John David McCalpin, Round Rock, TX (US); Balaram Sinharoy, Poughkeepsie, NY (US); Dereck Edward Williams, Austin, TX (US); Kenneth Lee Wright, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 431 days.

(21) Appl. No.: 10/422,677

(22) Filed: Apr. 24, 2003

(65) Prior Publication Data

US 2004/0215896 A1     Oct. 28, 2004

(51) Int. Cl.
*G06F 12/00* (2006.01)
(52) U.S. Cl. ............... 711/144; 711/133; 711/134; 711/135; 711/141; 711/142; 711/143
(58) Field of Classification Search ........ 711/133–135, 711/141–144
See application file for complete search history.

(56) References Cited

U.S. PATENT DOCUMENTS 5,893,149 A * 4/1999 Hagersten et al. .......... 711/135
6,721,853 B2 * 4/2004 Guthrie et al. ............. 711/135
6,754,782 B2 * 6/2004 Arimilli et al. ............. 711/144

OTHER PUBLICATIONS

Hennessy and Patterson, Computer Organization and Design, 1997, Morgan Kaufmann Publisher, Second Edition, pp 179-180.*
Emu8086, Assembler Tutorial for Beginners, Jan. 2003, pp 1-4 http://www.emu8086.com/assembly_language_tutorial_assembler_reference/asm_tutorial_01.html.*

* cited by examiner

*Primary Examiner*—Donald Sparks
*Assistant Examiner*—Bao Q. Truong
(74) *Attorney, Agent, or Firm*—Casimer K. Salys; Joseph P. Lally; Anthony V. S. England

(57) ABSTRACT

A microprocessor and a related compiler support a local cache block flush instruction in which an execution unit of a processor determines an effective address. The processor forces all pending references to a cache block corresponding to the determined effective address to commit to the cache subsystem. If the referenced cache line is modified in the local cache (the cache subsystem corresponding to the processor executing the instruction), it is then written back to main memory. If the referenced block is valid in the local cache it is invalidated, but only in the local cache. If the referenced block is not valid in the local cache, there is no invalidation. Remote processors receiving a local cache block flush instruction from another processor via the system ignore the instruction.

17 Claims, 3 Drawing Sheets

LOCALIZED CACHE BLOCK FLUSH INSTRUCTION

BACKGROUND

1. Field of the Present Invention

The present invention generally relates to the field of microprocessor architectures and more particularly to multiprocessor architectures employing a cached memory subsystem.

2. History of Related Art

The related concepts of cache memory subsystems and data locality are well known in the field of microprocessor based data processing systems. Cache memory refers to one or more small but fast storage arrays that are architecturally and heuristically closer to the processor core than the system's main memory (DRAM). Because of their limited size, cache memories have only the capacity to hold a portion of the information contained in the system's main memory. When a required piece of data is not present in cache memory, the system must access main memory for the data at a significant cost in terms of processing overhead. The benefit obtained by incorporating a cache memory is strongly correlated to the percentage of data access requests that the cache memory can satisfy (commonly referred to as the cache "hit" rate).

Fortunately, relatively small cache memories can frequently provide acceptably high hit rates because, as it turns out in many applications, the data that is most likely to be accessed in the near future is data that has been accessed relatively recently. Thus, by simply storing the most recently accessed data, a cache memory subsystem can provide the microprocessor core with fast access to data that is most likely to be required.

Ultimately, however, it is impossible to implement a cache memory with a 100% hit rate with a cache memory that is significantly smaller than the main memory. To achieve the highest hit rate possible and to fully utilize the limited cache memory that is available, designers are always interested in exploring the manner in which data is maintained in the cache. As an example, the instruction sets of some microprocessors include support for user level and/or supervisory level cache management instructions. Cache management instructions generally enable direct software control over some aspects of the cache memory subsystem.

The PowerPC® family of processors from IBM, for example, include support for several cache management instructions including the data cache block flush (dcbf) instruction. The dcbf instruction enables software to invalidate a specifiable block in the cache memory subsystem. The dcbf instruction is beneficial in circumstances, for example, when it is desirable to enforce coherency (all the way down to main memory) before permitting a subsystem that does not participate in the cache coherency protocol to access a particular block of data.

The dcbf instruction is also useful in circumstances when it can be determined with reasonably good probability that related memory locations are highly likely to be accessed one or a few times in close succession and then highly unlikely to be accessed thereafter, at least for a relatively long time. Data exhibiting this characteristic is said to have high spatial locality but low temporal locality. Spatial locality refers to a characteristic of data in which an access to data at memory address A, for example, is highly likely to be followed by one or more data accesses to the memory address that follows A sequentially. Temporal locality refers to a characteristic of data in which data that is accessed at time T is highly likely to be accessed again at time T+delta, where delta represents a relatively short interval of time. It is clear that data having high temporal and spatial locality is a good candidate for storage in a cache memory subsystem. Indeed, the reality of temporal locality is a fundamental reason for having cache memories.

In certain applications, however, data may exhibit high spatial locality and low temporal locality. This situation presents a dilemma to conventionally implemented cache subsystems. On the one hand it is desirable to prefetch and cache data that has high spatial locality to prevent a stall when the data is required. On the other hand, it is undesirable to leave this data in the cache when other data with a high temporal locality could be residing.

Microprocessors have long included support for instructions commonly referred to as "kill" instructions that invalidate a cache specified cache line thereby freeing up the cache to accept new data. In the context of multiprocessor systems operating with multiple non-synchronized cores, the kill instruction invalidates the specified cache block on all of the system's processors. Unfortunately, killing a cache block in this manner could result in the invalidation of a particular block line before the corresponding processor has completed all references to the block thereby resulting in a potentially undeterminable state.

Accordingly, it would be desirable to implement a processor that enabled operating systems, programmers, and/or processors to control, identify, and invalidate selected cache lines without incurring the potential timing and coherency issues that are raised in a multiprocessor environment.

SUMMARY OF THE INVENTION

The problem identified above is in large part addressed by a microprocessor and microprocessor execution method that support a local cache block flush instruction in which an execution unit of a processor determines an effective address. The processor first forces all pending references to the specified cache block to commit to the cache subsystem. If the referenced cache line is modified in the local cache (the cache subsystem corresponding to the processor executing the instruction), it is then written back to main memory. If the referenced block is valid in the local cache it is invalidated, but only in the local cache. If the referenced block is not valid in the local cache, no action is taken. Remote processors receiving a local cache block flush instruction from another processor via the system ignore the instruction.

BRIEF DESCRIPTION OF THE DRAWINGS

Other objects and advantages of the invention will become apparent upon reading the following detailed description and upon reference to the accompanying drawings in which.

Figure 1:
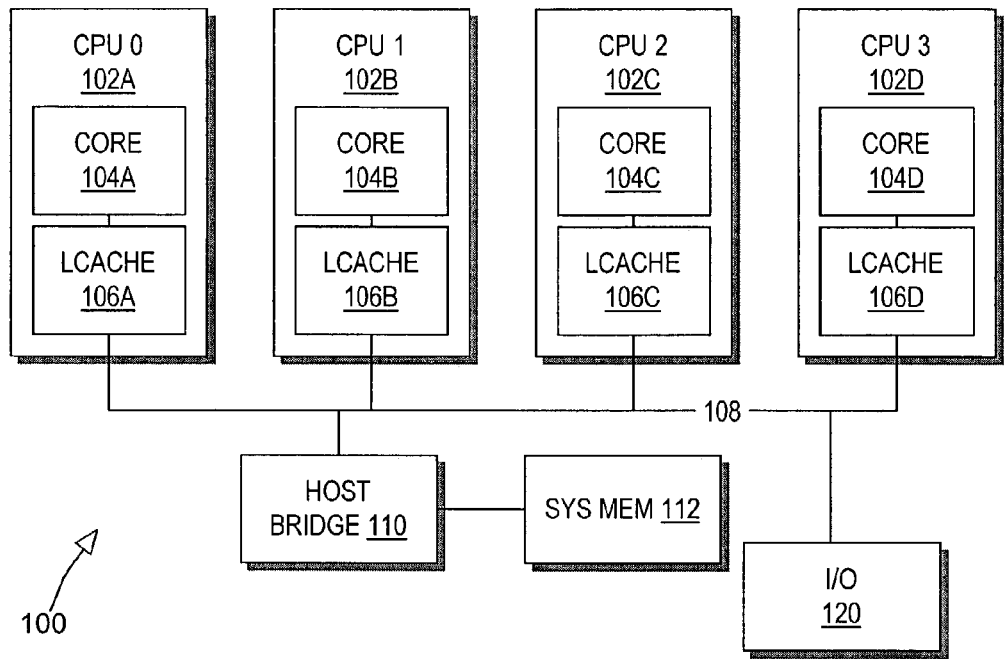
FIG. 1 is a block diagram of selected elements of a multi-processor data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention contemplates a microprocessor based data processing system that supports a cache management instruction for flushing a specified cache line of a specific processor in a multiprocessor environment. When the instruction is executed, an effective address is determined. If the determined effective address "hits" to a cache block in the cache memory of the local processor (the processor executing the instruction), a local cache block flush procedure is initiated. If the cache block is in a modified state, the block is written back to main memory. The block is then invalidated locally thereby freeing up space in the cache block available for a memory segment that may be better suited for the cache.

Turning now to the drawings, FIG. 1 depicts selected elements of a multi-processor data processing system 100 exemplary of a design in which the present invention may be practiced. In the depicted embodiment data processing system 100 includes a set of four processors 102A through 102D (generically or collectively referred to herein as processor(s) 102). Each processor 102A through 102D includes a corresponding processor core 104A through 104D (generically or collectively referred to herein as core(s) 104) and a corresponding local cache memory unit 106A through 106D (generically or collectively referred to herein as local cache(s) 106). In one embodiment, each core 104 includes two distinct and fully functional processors that share a common local cache memory. In one embodiment, each local cache 106 includes three levels (L1, L2, and L3) of cache memory where each successive level is larger than the preceding level. In an embodiment exemplary of the POWER4® processor from IBM Corporation, for example, the L1 and L2 cache units as well as the decoding and directory circuitry for the L3 cache are integrated onto a single chip with the processor core 104 while the actual L3 memory is external.

The various processors 102 of system 100 communicate via a system bus 108. Memory accesses (loads and stores) executed by any of the processors produce transactions on the host bus that are needed to maintain coherency. If, for example, processor 102A writes data to a memory address, the write transaction must be sent over host bus 108 so that all other local caches 106 can determine if they have a copy of the cache block corresponding to the memory address resident and, if so, they can modify their copies of the block.

System 100 as depicted in FIG. 1 also includes a host bridge 110 that provides interfaces between the host bus 110 and a system memory 112. The system's I/O devices, which are collectively represented in FIG. 1 by reference numeral 120, are connected to the system bus 108. I/O devices 120 encompass any of the traditional devices associated with data processing systems including, as examples, a hard disk controller, a video or graphics adapter, a high speed network interface card, and so forth. Access to system memory 112 is shared among the processors 108. This type of multiprocessor system is commonly referred to as a symmetric multi-processor (SMP) system to emphasize that each processor has theoretically equal access to system memory 112.

Figure 2A:
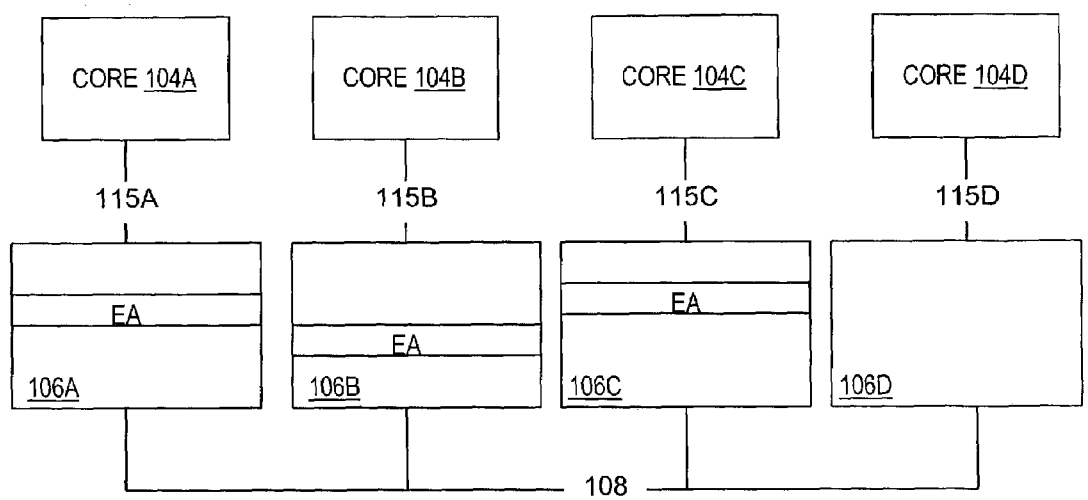
FIG. 2A illustrates a state of a cache memory subsystem of the system of FIG. 1 prior to executing a local cache memory management instruction according to the present invention.

Referring to FIG. 2A, the cache memory subsystem of system 100 is depicted to illustrate benefits of the present invention. As depicted in FIG. 2A, the cache memory subsystem includes each of the local caches 106A through 106D. Each local cache unit 106 has at least one port coupled to host bus 108 and at least one port coupled to a bus (referred to herein as the 'local' bus) that connects each local cache 106 with its corresponding core 104. The local busses are indicated by reference numerals 115A through 115D (generically or collectively referred to as local bus(ses) 115). FIG. 2A illustrates a snap shot of the cache memory subsystem at an instance when a particular cache block identified by the two letter designation "EA" is resident in local caches 106A through 106C and invalid or otherwise absent in local cache 106D. The designation EA is an acronym for effective address and is intended to emphasize that every effective address generated during execution of an instruction is mapped to a corresponding cache block. In actual practice, a translation from the EA to a corresponding "real" address occurs when the cache memory is accessed. Thus, data is typically stored in the cache memory according to its real address. For purposes of consistency, however, this application will refer exclusively to the effective address of a memory reference and it will be understood that the cache memory arranges data according to real addresses.

In a simple implementation, every EA maps to a block identified by the upper 20 bits of its corresponding real address. A cache block may be stored in different physical locations within the cache depending upon the cache subsystem architecture. Thus, as depicted, the cache block corresponding to the effective address EA is found in different physical locations with local caches 106A, 106B, and 106C.

An important feature of the depicted cache subsystem is the use of independent ports for access to the local bus 115 and host bus 108. The use of separate ports or interfaces, in addition to providing performance benefits, facilitates the identification of transactions that issue from a cache's local processor and transactions that originate with non-local or remote processors. A distinction between "local transactions" and other transactions is used in the present invention to manage the contents of the various cache memory units 106.

Figure 2B:
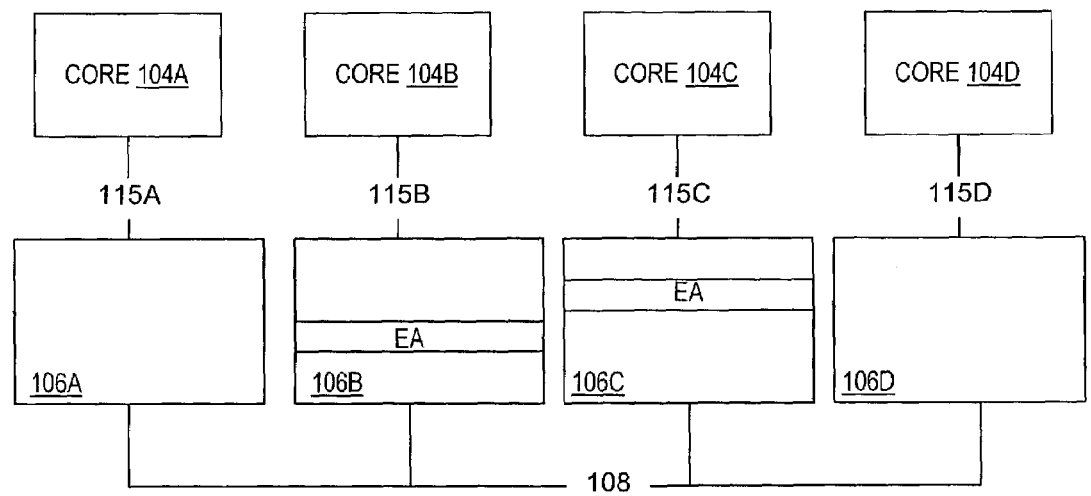
FIG. 2B illustrates a state of the cache memory subsystem of FIG. 2A after execution of the local cache memory management instruction.

Illustration of the general concept is provided by comparison between FIG. 2A and FIG. 2B. In this simplified illustration, FIG. 2A represents the state of the processor subsystem before a particular instruction sequence is executed while FIG. 2B represents the state of the cache memory subsystem after the sequence executes. In FIG. 2A, as discussed in the preceding paragraph, three of the local cache units 106 contain valid copies of a cache block EA that corresponds to a particular effective address. According to the present invention, an instruction is then executed by an execution unit in one of the processor cores 104 that flushes the EA cache block from the processor's local cache 106 while leaving the remaining copies of EA in the other local caches intact. In the illustrated example specifically, a local cache block flush (LCBF) instruction according to the present invention is executed by processor core 104A. The LCBF instruction calculates an effective address EA (that corresponds to a real address). Each of the local cache units include a cache controller that supports the LCBF by flushing the block corresponding to the effective address EA if the LCBF was issued locally (e.g., received via the local bus port) while ignoring the instruction otherwise. Thus, as depicted in FIG. 2B, following the execution of an LCBF by core 104A, local cache unit 106A no longer contains a valid copy of cache block EA while the EA blocks in caches 106B and 106C remain valid. Although this illustration includes certain simplifying assumptions, such as an assumption that the cache block EA is unmodified in local cache 106A when the LCBF is executed, it emphasizes the ability to manage cache memory units locally in a tightly bound SMP environment. In contrast to a conventional KILL instruction, the LCBF operates locally and incorporates additional control by forcing any pending references to the cache block to complete before invalidation occurs.

This localized cache management ability may be desirable to address situations where, for example, it is desirable to prefetch code (i.e., store the code in a cache before it is needed by the processor) to maintain performance, but undesirable to keep the code in the cache after it is executed. One can imagine code, for example, that includes one or more embedded loops for adding the elements of arrays of differing sizes. If the inner loop is executing for a great majority of the time, it may be beneficial to cast code associated exclusively with the outer loop out of the cache after each iteration of the outer loop. In other words, prefetching the outer loop code into cache before execution is desirable from a performance perspective, but maintaining it in the cache during times when it is known that it will not be needed is undesirable.

Existing cache management techniques include the ability to prefetch without caching code and the ability to globally kill a particular cache block. The prefetch without cache solution is optimized only for the case when it is known that the prefetched code will execute once and only once. In many cases such as the embedded loop example described above, however, a cache block may be accessed more than once before it becomes desirable to cast it out of the cache. If, for example, a code sequence that is executed relatively infrequently modifies three consecutive elements of an array, the prefetch without cache option impacts performance negatively because a stall will occur during the second and third references to the array. The global kill cache management instruction is useful in a uni-processor environment, but can create problems in an environment where multiple processors are executing non-synchronously because a kill issued by a first processor or master may well invalidate a cache block that is needed for an in-flight instruction on another processor.

Figure 3:
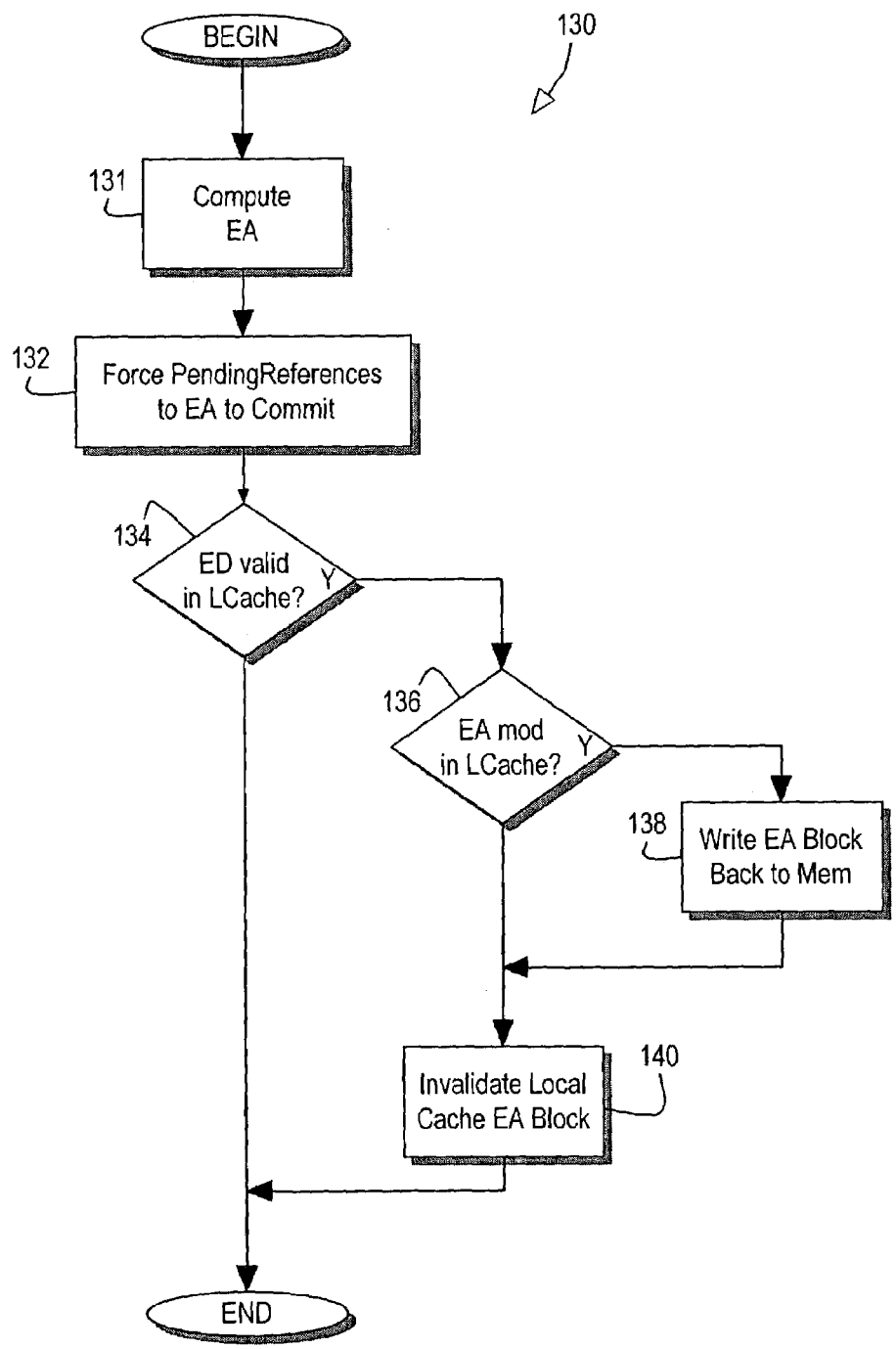
FIG. 3 is a flow diagram illustrating a method of managing a cache memory subsystem according to an embodiment of the present invention.

The invention provides a selective, local cache management technique that addresses the problems associated with conventional cache management method and instructions. Referring to FIG. 3, a flow diagram illustrating a conceptual method 130 of executing an LCBF instruction according to one embodiment of the present invention is illustrated. In the depicted embodiment, the LCBF instruction determines (block 131) an address. In one embodiment, the processor uses effective addresses while executing instructions and then translates or maps effective addresses to real addresses when accessing the cache memory. Consistent with the description of FIG. 2, the flow diagram of FIG. 3 will be described with respect to the effective addresses under the understanding that the effective address may be mapped to a real address as part of the cache access mechanism.

If the particular LCBF instruction implementation includes two general purpose register operands, the EA could be the sum of the two operands. In other implementations, there may be permutations of the LCBF such as an LCBF immediate in which the EA is explicitly indicated in the instruction, LCBF indirect in which the EA is determined by the contents of a memory location whose address is specified a memory location referred to by the instruction, and so forth to include other known addressing modes.

The depicted embodiment of the LCBF then insures coherency or synchronization by forcing (block 132) all locally pending store instructions that reference EA cache block (the cache block to which the EA is mapped in the particular cache subsystem architecture) to commit to the cache memory hierarchy. This enforcement can be accomplished by referring to a scoreboard or register renaming table to determine whether any issued but uncommitted store instructions refer to the EA cache block. After all pending references are committed to the cache hierarchy, the EA cache block in local cache 106 will be current when the LCBF is executed.

The LCBF can then proceed by first determining (block 134) whether the EA is valid in the local cache 106. If the EA misses (or is not valid) in local cache 106, no further action is taken and the LCBF effects no change of the local cache (other than forcing an earlier commitment of store instructions to the block). If the EA is valid in local cache 106, a determination of whether the EA cache block is modified is made (block 136). If the EA cache block is valid and modified, the modified cache block is written back (block 138) to memory. Whether or not the EA cache block is modified, it is then locally invalidated (invalidated in the local cache only) (block 140). Invalidation occurs regardless of whether the cache block is in a shared state or exclusive state. Local invalidation of an exclusive cache block is acceptable (does not disrupt the coherency state) because the exclusive state means that no remote cache has a copy of the block. Local invalidation of a cache block exhibiting a shared state is also acceptable because the shared state merely indicates that another cache may have an (unmodified) copy of the block. The MESI protocol, for example, does not alter the state of a Shared block in a cache following any host bus 108 transaction other than a Write that hits, which would only occur for a Modified cache block.

Local cache 106 accomplishes local invalidation by determining the origin of the LCBF instruction. If the instruction originated with the local cache's core 104, the instruction is received via local bus 115 and executed. If the instruction originated with a remote core, the transaction is received via host bus 108 and is treated as a no-op. In this manner, the present invention provides for a localized cache management technique that can be used to improve performance in suitable code sequences.

Figure 4:
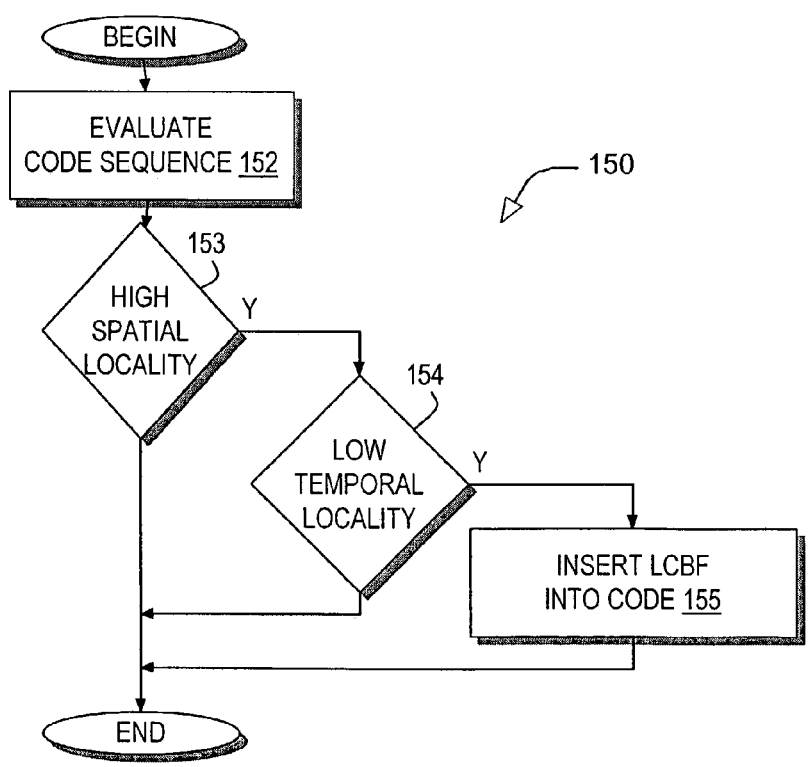
FIG. 4 is a flow diagram representation of a compiler supporting the cache memory management instruction illustrated in FIG. 3.

One embodiment of the invention contemplates a compiler that is configured to determine source code sequences that might benefit from the use of the LCBF instruction and to insert one or more LCBF instructions into the executable (object) code. This embodiment of the invention is implemented as a set of computer executable instructions stored on a computer readable medium (i.e., software). In this embodiment, which is conceptually illustrated in the flow diagram of FIG. 4, a compiler 150 first evaluates (block 152) a source code sequence to determine if the sequence might benefit by the inclusion of an LCBF instruction. As an example, the compiler could determine (block 153) whether the code sequence exhibits a high degree of spatial locality with respect to a particular portion of the memory address space. If the compiler also determines (block 154) that the same code sequence simultaneously exhibits a low degree of temporal locality with respect to the portion of system memory address space under consideration, the compiler beneficially inserts (block 155) an LCBF instruction at a location in the object code where the spatial locality of the memory portion has been exhausted. In this example embodiment, the temporal locality threshold may be related to the latency associated with a cache miss. If the compiler determines that the portion of system memory address space under consideration will not be accessed for a duration that is greater than the cache miss latency, the code sequence accessing this address space is a candidate for an LCBF. In other applications the LCBF instruction is available as a cache management tool to the program developer for direct insertion into source code.

It will be apparent to those skilled in the art having the benefit of this disclosure that the present invention contemplates a method and system for local cache management control to improve performance. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of executing an instruction by a microprocessor in a multiprocessor environment, comprising:
   determining an address by the microprocessor;
   responsive to determining that a cache block corresponding to the address is present in a cache memory unit local to the microprocessor;
      prior to invalidating the cache block, forcing all pending references to the corresponding cache block to commit to the cache memory hierarchy;
      invalidating the cache block in the local cache memory unit; and
   allowing any cache block corresponding to the address that is present in a remote cache memory unit to remain valid.

2. The method of claim 1, wherein forcing the cache block to commit to the cache memory hierarchy is further characterized as forcing the cache block to commit to L1, L2, and L3 cache memory units local to the processor.

3. The method of claim 1, further comprising, responsive to determining that the cache block corresponding to the address is present and modified in a cache memory unit local to the microprocessor, writing the cache block back to system memory.

4. The method of claim 1, wherein the instruction contains two operands and wherein determining the address is characterized as by adding the two operands together.

5. The method of claim 4, wherein the two operands are register references and wherein adding the two operands together comprises adding the contents of the two source operands together.

6. The method of claim 5, wherein the instruction leaves the contents of the general purpose registers unaffected.

7. A compiler computer program product comprising computer executable instructions, stored on a computer readable storage medium, for generating object code, the compiler including instructions for generating object code including a local cache block flush instruction that, when executed by a microprocessor, performs operations including:
   determining an address by the microprocessor;
   responsive to determining that a cache block corresponding to the address is present in a local cache memory unit;
   prior to invalidating the cache block, forcing all pending references to the corresponding cache block to commit to the cache memory hierarchy;
   invalidating the cache block in the cache memory unit local to the microprocessor; and
   allowing any cache block corresponding to the address that is present in a cache memory unit local to a remote microprocessor to remain valid.

8. The compiler of claim 7, wherein forcing the cache block to commit to the cache memory hierarchy is further characterized as forcing the cache block to commit to L1, L2, and L3 cache memory units local to the processor.

9. The compiler of claim 7, further comprising, responsive to determining that the cache block corresponding to the address is present and modified in a cache memory unit local to the microprocessor, writing the cache block back to system memory.

10. The compiler of claim 7, wherein the instruction contains two operands and wherein determining the address is characterized as by adding the two operands together.

11. The compiler of claim 10, wherein the two operands are register references and wherein adding the two operands together comprises adding the contents of the two source operands together.

12. The compiler of claim 11, wherein the instruction leaves the contents of the general purpose registers unaffected.

13. The compiler of claim 7, wherein the compiler is configured to insert the local cache block flush instruction into executable code responsive to determining a source code sequence having a predetermined characteristic.

14. The compiler of claim 13, wherein determining the source code sequence having the predetermined characteristic is further characterized as determining a source code sequence characterized by a minimum degree of spatial locality and a maximum degree of temporal locality.

15. A multiprocessor data processing system, comprising:
   a first microprocessor and a second microprocessor;
   a first cache memory unit connected to the first microprocessor by a first local bus and a second cache memory unit connected to the second microprocessor by a second local bus, and further wherein the first cache memory unit is configured for processing a local cache block flush instruction, said processing including:
      responsive to determining that the local cache block flush instruction originated from the first processor, invalidating a cache block in the first cache memory unit, wherein the cache block corresponds to an address indicated by the local cache block flush instruction; and
      responsive to determining that the local cache block flush instruction originated from the second microprocessor, processing the local cache block flush instruction as a no-op;
      wherein the first microprocessor is configured for forcing all pending references to the cache block to commit to a cache memory hierarchy of the first microprocessor prior to invalidating the cache block.

16. The system of claim 15, wherein the first cache memory unit is further configured for determining that the cache block is in a modified state and, responsive thereto, writing the cache block back to system memory.

17. The system of claim 15, wherein the first and second cache memory units share access to a host bus, and wherein the first cache memory unit determines an origin of the local cache block flush instructions by determining whether the local cache block flush instructions was received via the first local bus or the host bus.

* * * * *